(12) United States Patent
Crevling, Jr. et al.

(10) Patent No.: US 9,826,688 B2
(45) Date of Patent: Nov. 28, 2017

(54) VACUUM DEVICE WITH POSITIVE PRESSURE TANK

(75) Inventors: Robert L. Crevling, Jr., Williamsport, PA (US); Jason Gottschall, South Williamsport, PA (US); Randy L. Buss, Muncy, PA (US)

(73) Assignee: SHOP VAC CORPORATION, Williamsport, PA (US)

( * ) Notice: Subject to any disclaimer, the term of this patent is extended or adjusted under 35 U.S.C. 154(b) by 862 days.

(21) Appl. No.: 12/613,616

(22) Filed: Nov. 6, 2009

(65) Prior Publication Data

US 2011/0107549 A1 May 12, 2011

(51) Int. Cl.
| | |
|---|---|
| *A47L 9/00* | (2006.01) |
| *A01G 3/00* | (2006.01) |
| *A47L 7/00* | (2006.01) |
| *A47L 5/22* | (2006.01) |
| *A47L 9/14* | (2006.01) |
| *A47L 9/22* | (2006.01) |

(52) U.S. Cl.
CPC .............. *A01G 3/002* (2013.01); *A47L 5/225* (2013.01); *A47L 7/00* (2013.01); *A47L 9/1409* (2013.01); *A47L 9/22* (2013.01)

(58) Field of Classification Search
CPC ........... A47L 7/00; A47L 5/225; A47L 9/1409
USPC ............. 15/345, 346, 328, 330, 405
See application file for complete search history.

(56) References Cited

U.S. PATENT DOCUMENTS

| | | | |
|---|---|---|---|
| 2,134,314 A * | 10/1938 | O'Donnell ..................... 292/115 |
| 2,757,753 A * | 8/1956 | Kasper ............................ 55/314 |
| 3,510,154 A * | 5/1970 | Sheff ............................... 285/39 |
| 4,270,668 A | 6/1981 | Berfield | |
| 4,498,695 A * | 2/1985 | Pardo ............................. 292/260 |
| 4,683,608 A * | 8/1987 | Berfield et al. ................. 15/328 |
| 5,087,088 A * | 2/1992 | Milam ........................... 292/110 |
| 6,032,939 A * | 3/2000 | Chen .............................. 269/249 |
| 6,385,809 B1 * | 5/2002 | Martin et al. ................... 15/326 |
| RE39,595 E | 5/2007 | Liu .................................. 55/368 |
| D599,968 S | 9/2009 | Crevling, Jr. et al. ......... D32/23 |
| 7,654,480 B2 * | 2/2010 | Baer et al. ....................... 241/36 |

(Continued)

OTHER PUBLICATIONS

International Search Report and Written Opinion for corresponding International Application No. PCT/US2010/052130, dated Nov. 26, 2010.

(Continued)

*Primary Examiner* — Joseph J Hail
*Assistant Examiner* — Henry Hong
(74) *Attorney, Agent, or Firm* — Marshall, Gerstein & Borun LLP

(57) ABSTRACT

In a device that uses the tank from a conventional vacuum cleaner, the tank is under positive pressure. A cap fits over a tubular element inside the tank and closes the conventional air inlet. The cap has a peripheral wall that extends between a solid back and a front radial rim, and interior axial ribs. The lid is held by a latch that has an element that pivots with respect to the tank and the lid, and a clasp that has a bent arm. A tensioner pulls the bent arm. The tensioner has a threaded rod that extends from a handgrip though a hole in the pivoting element. A nut on the clasp receives a threaded end of the threaded rod, enabling the handgrip to be used to tighten the clasp. An outer wall of the latch is disposed outwardly of the threaded rod and the bent arm.

4 Claims, 5 Drawing Sheets

(56) References Cited

U.S. PATENT DOCUMENTS

| | | |
|---|---|---|
| 8,075,650 B2 * | 12/2011 | Hale .............................. 55/378 |
| 8,186,527 B2 * | 5/2012 | Liu ............................... 215/317 |
| 2002/0148067 A1 * | 10/2002 | Streeter ........................ 15/327.1 |
| 2002/0178533 A1 | 12/2002 | Berfield et al. |
| 2006/0179601 A1 * | 8/2006 | Crevling et al. ................ 15/326 |
| 2006/0191099 A1 | 8/2006 | Fry et al. ......................... 15/353 |
| 2008/0072396 A1 | 3/2008 | Baer et al. ................... 15/327.1 |
| 2008/0250602 A1 * | 10/2008 | Liddell ............................ 15/410 |
| 2010/0083456 A1 | 4/2010 | Norell et al. ................... 15/347 |

OTHER PUBLICATIONS

International Preliminary Report on Patentability from corresponding international application No. PCT/US10/52130, dated May 8, 2012.

Extended European Search Report, corresponding European application No. EP 10828737.6 (dated Jun. 3, 2014, received by European agent on Jun. 13, 2014).

* cited by examiner

VACUUM DEVICE WITH POSITIVE PRESSURE TANK

CROSS-REFERENCE TO RELATED APPLICATIONS

Not applicable.

BACKGROUND OF THE INVENTION

The present invention relates generally to vacuum devices and particularly to conventional vacuum cleaners that are modified for use in circumstances where the tank is under positive pressure, rather than negative pressure.

BRIEF SUMMARY

A new mulching vacuum device has been developed that uses the tank from a conventional vacuum cleaner. In the new device, a new inlet has been provided in the lid and the airflow has been redirected so that the tank is under positive pressure, rather than negative pressure. New elements were developed to implement this new arrangement.

The new vacuum device uses the tank from a conventional vacuum cleaner. The tank has an open rim on which a newly designed lid fits. The new lid has both an inlet and an outlet through which exhaust air exits the vacuum device. A vacuum source on the lid draws air into the vacuum device through the inlet. The air blows into the tank before being exhausted, leading to the interior of the tank being under positive pressure.

The conventional tank that is used in this vacuum device has an opening that is designed for use as an air inlet. This opening is provided with a tubular element. In a conventional vacuum cleaner, this tubular element serves to deflect incoming airflow downwardly toward the bottom of the tank. In the new vacuum device, collected debris could blow out of this opening.

A new positive pressure cap was developed to prevent this. The removable cap fits over the tubular element inside the tank and closes the opening when the tank is pressurized by the vacuum source. The cap has a peripheral wall that extends between a solid back and a front radial rim, and interior axial ribs.

Because the tank in the new vacuum device is under positive pressure, rather than negative pressure, a new latching mechanism was developed to ensure that the lid stays secured to the open rim. The new latch has a pivoting element that pivots with respect to the tank and the lid, and a clasp that has a bent arm that fits against a latch rim. A tensioner that is connected to the pivoting element pulls the bent arm against the terminal edge of the latch rim and thus holds the lid against the open rim. The tensioner has a handgrip and a threaded rod that extends from the handgrip though a hole in the pivoting element. A nut that is fixed on the clasp receives a threaded end of the threaded rod, enabling the handgrip to be used to tighten the clasp. An outer wall of the latch is disposed laterally outwardly of the threaded rod and the bent arm on the clasp.

BRIEF DESCRIPTION OF THE DRAWINGS

The invention may be better understood by referring to the accompanying drawings, in which.

DETAILED DESCRIPTION

Figure 1:
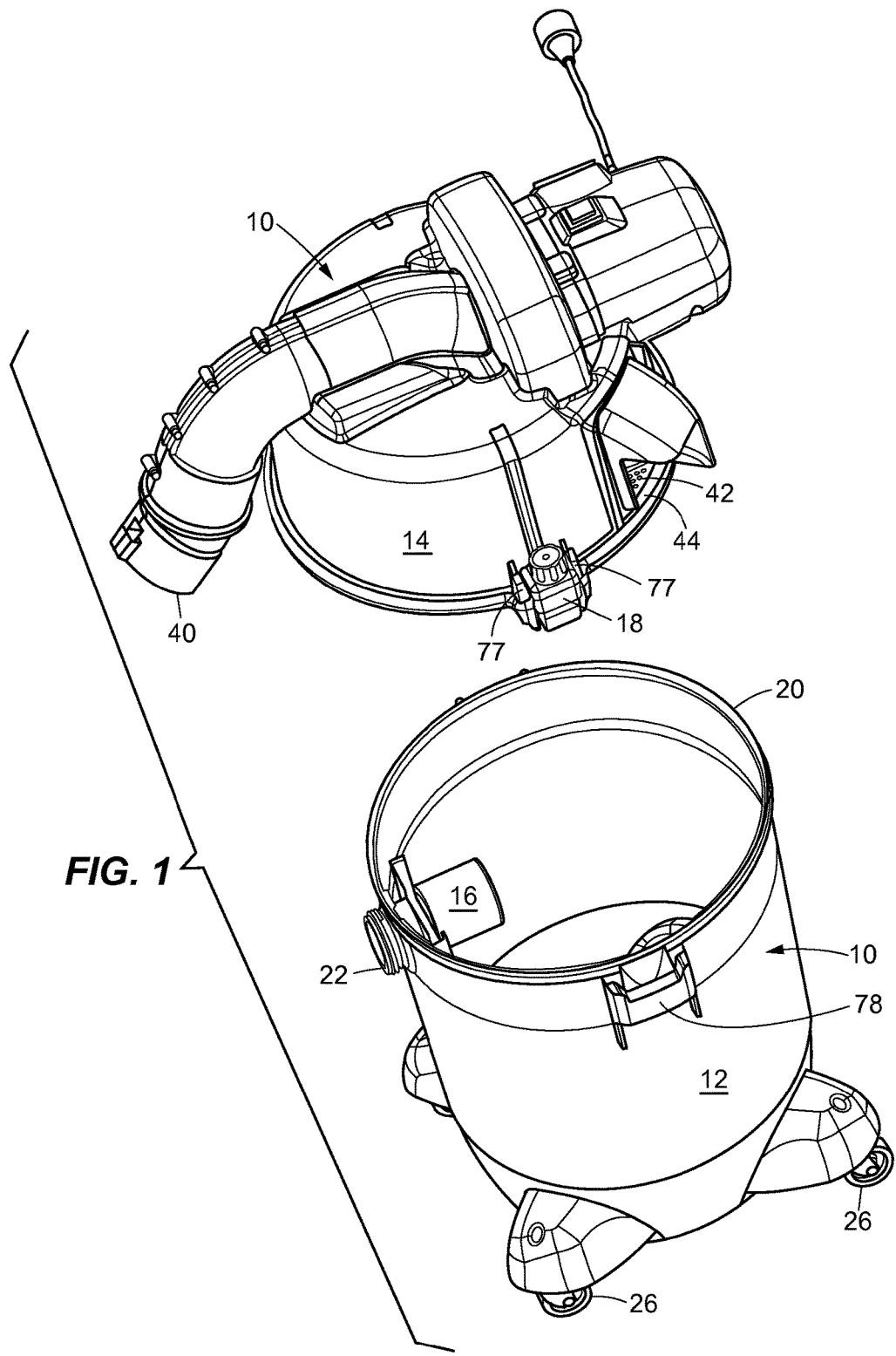
FIG. 1 is an exploded perspective view of one embodiment of the invention.

FIG. 1 illustrates one embodiment of a vacuum device 10 that has been modified for use in an arrangement in which the tank is under positive pressure, rather than negative pressure. The illustrated vacuum device is adapted with a mulcher that can be used for mulching yard waste such as leaves and branches. However, the modifications may also be useful in other settings.

The illustrated vacuum device has a tank 12, a lid 14, a removable cap 16, and a latch 18. Each part will be discussed below.

The Tank

The tank 12 is used to store waste, and can vary in volume. The tank that is seen in FIG. 1 is a conventional tank used in wet/dry vacuum cleaners. It holds liquid (it is made of solid plastic) and has an interior reservoir that has a volume of between 1 and 55 gallons. The tank has a rigid open rim 20 on the top and a defined opening 22 on the side.

The open rim provides a location where the lid can be attached. The illustrated open rim is generally circular in shape and is between 8" and 36" across, but the size and shape can vary. Preferably, the open rim is large enough to accommodate a conventional wet/dry vacuum filter, and enable the contents of the tank to be easily dumped by the operator.

Figure 2:
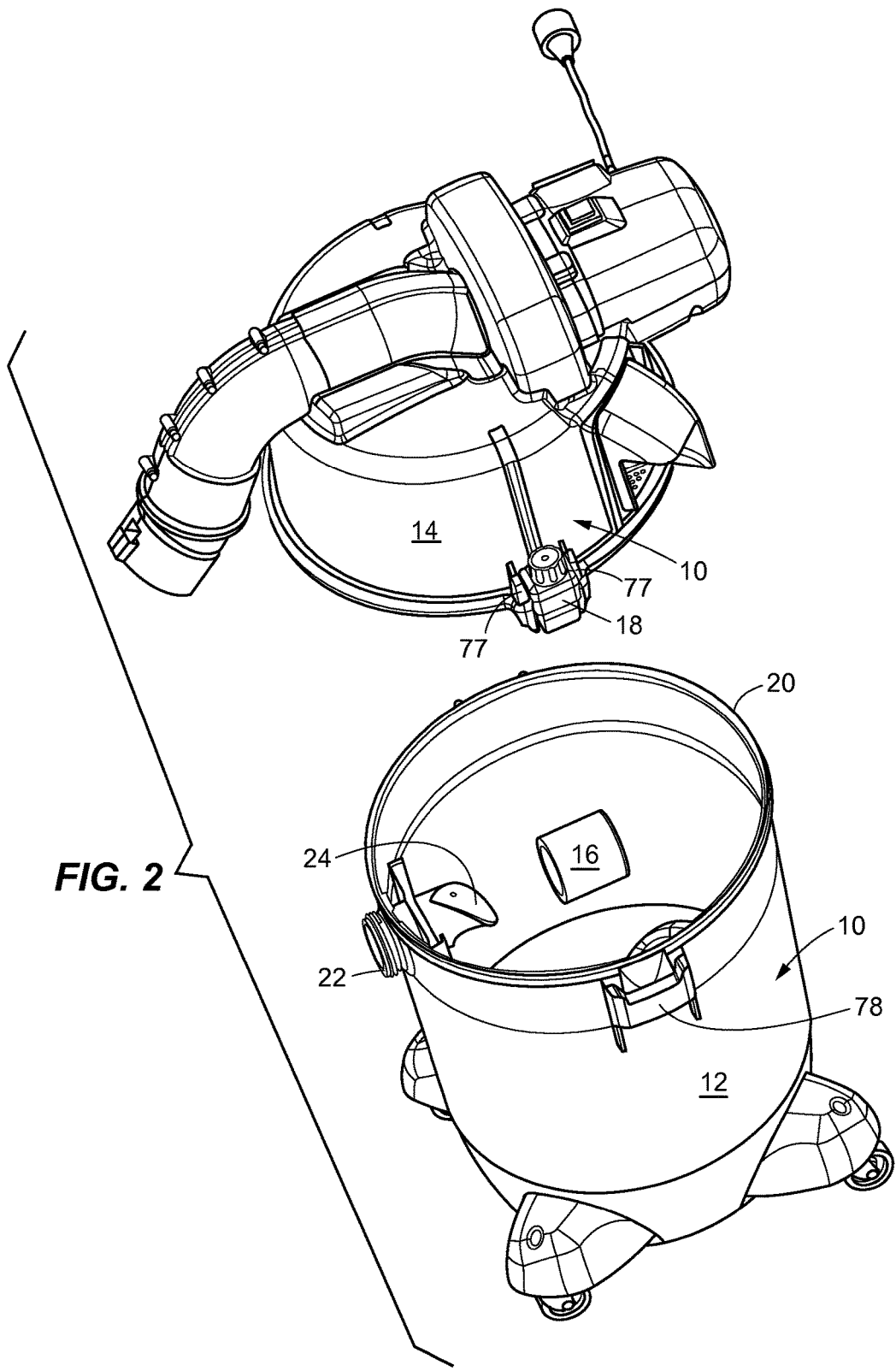
FIG. 2 is the same view, with the cap removed.

The illustrated opening 22 on the tank 12 leads to the interior of the tank, and is one that is configured to receive a hose so that the opening can be used as an inlet for conventional vacuuming. The illustrated opening is between 1" and 4" in diameter and has a conventional threaded external segment where a hose can be attached. As seen in FIG. 2, the opening also has a tubular element 24 that extends inwardly into the tank and is between 1" and 4" long. The illustrated tubular element bends downwardly into the tank. In other devices, the tubular element bends tangentially (sideways) into the tank, or downwardly and tangentially (partially downwardly and tangentially, i.e., angled).

When the tank is used with a conventional vacuum cleaner, debris-laden air can be drawn into the tank through the opening, and this tubular element deflects the air downwardly toward the bottom of the tank.

The illustrated tank 12 also has optional casters 26 on the bottom. These conventional casters help a user to move the vacuum device from one location to another.

The Lid

The lid 14 fits onto the open rim of the tank 12, and houses a vacuum source. Although other materials could be used, the illustrated lid is made of plastic. When installed on the tank, it seals the open rim 20 of the tank, effectively stopping air from blowing out of the open rim of the tank. For use as a mulcher, the illustrated lid has both an inlet 40 and an outlet 42, each described below.

A wide variety of different types of vacuum sources can be used. The vacuum source used in this lid 12 is an electric motor/fan assembly that provides suction and, for use in a mulcher, helps to draw yard waste into the device. In particular, the motor/fan assembly seen in co-pending application Ser. No. 11/859,760 (published as US-2008-0072396-A1) may be used. (The disclosure of that application is incorporated into this application be reference.) That vacuum source is particularly useful because it can be removed from the lid for servicing.

The inlet 40 provides entry to a flow path through the vacuum device 10. The illustrated inlet is in the form of 1" to 8" diameter rigid plastic conduit that is positioned over the top of the lid and leads to the vacuum source. Other arrangements are possible. When the vacuum source operates, it draws air and yard waste into the vacuum device through the inlet. Downstream of the vacuum source, the force of the vacuum source creates positive pressure in the tank 12.

The pressurized air downstream of the vacuum source is exhausted through the outlet 42 on the lid 14. The illustrated outlet is a 1" to 5" wide by ½" to 4" tall opening within a rigid rim 44 on a side of the lid. Other arrangements are possible.

The Removable Cap

Figure 3:
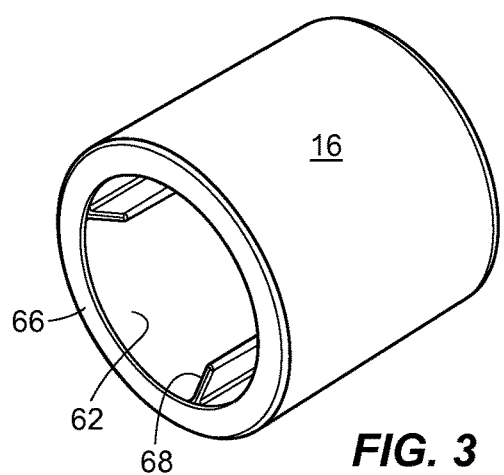
FIG. 3 is an enlarged perspective view of the cap.
Figure 4:
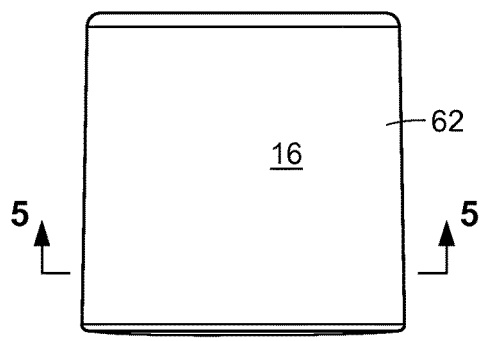
FIG. 4 is an enlarged side elevation of the cap.

The removable cap 16 fits closes the opening 22 on the tank 12 is pressurized by the vacuum source. As seen in FIG. 1, the cap is shaped to fit over the tubular element 24 on the inside of the opening 22 on the tank. The illustrated cap has a peripheral wall 62 see in FIGS. 3-5 that extends between a solid back 64 and a front radial rim 66. In width and length, the peripheral wall is sized larger than the tubular element, enabling the cap to fit over the tubular element. The front radial rim extends another ¹⁄₁₆" and ⅜" inwardly from the inside surface of the peripheral wall.

Figure 5:
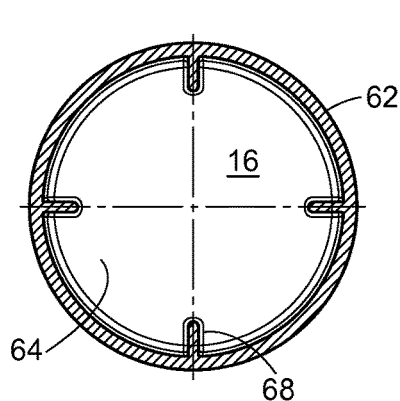
FIG. 5 is a cross-sectional view though lines 5-5 of FIG. 4.
Figure 6:
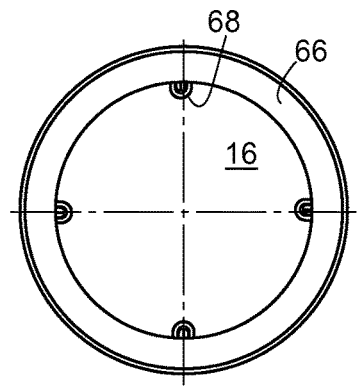
FIG. 6 is an enlarged end view of the open end of the cap.

The illustrated cap 16 also has interior axial ribs 68 that extend between the back 64 of the cap and the front radial rim 66. The four ribs that are shown in FIGS. 5 and 6 are spaced evenly across the circumference of the cap. These ribs fit snugly against the tubular element 24, and each project inwardly between ¹⁄₁₆" and ¼" from the inside edge of the front radial rim 66. The progressively wider inside dimensions of the ribs, the front radial rim, and the peripheral wall 62 make it easier to install the cap over the tubular element, while still effectively preventing debris from blowing out through the opening 22. For other tubular elements, the configuration of the cap may be different.

The peripheral wall 62, the back 64, the front radial rim 66, and the ribs 68 of the illustrated cap are all made of the same material, in this case a plastic material. This facilitates manufacture.

The Positive-Pressure Latches

Figure 7:
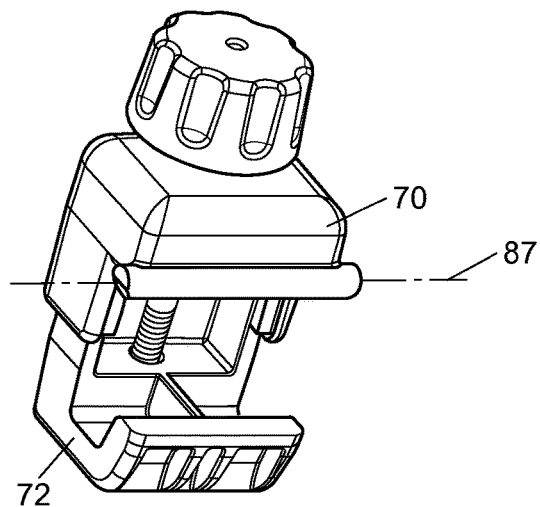
FIG. 7 is an exploded view of part of a latch.
Figure 8:
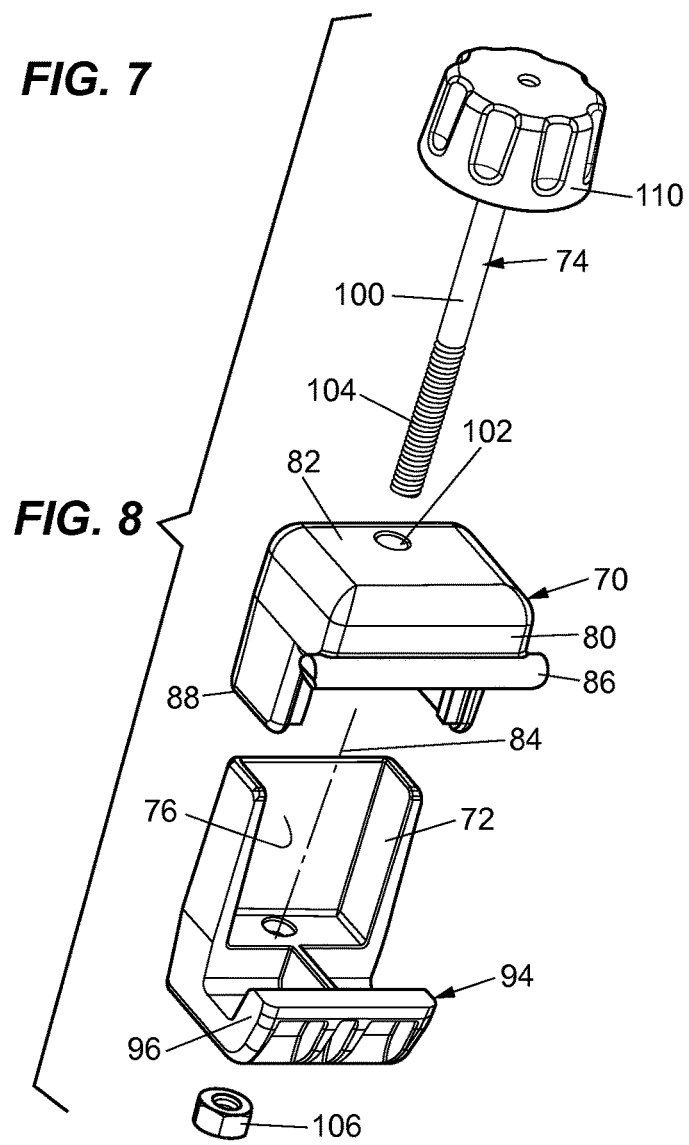
FIG. 8 is an exploded view of the latch.

FIGS. 1 and 2 show a positive pressure latch 18 on one side of the vacuum device 10. A matching latch is used on the other side of the device. These latches hold the lid 14 to the open rim 20 on the tank 12. As better seen in FIGS. 7 and 8 and discussed in more detail below, each latch has a pivoting element 70, a clasp 72, a tensioner 74, and an outer wall 76. The pivoting element is connected to either the lid or the tank. If it is connected to (i.e., permanently joined to) the lid, as it is here by connectors 77 (FIG. 1), then a matching latch rim 78 is connected to the tank, as seen in FIGS. 1 and 2. If the pivoting element is connected to the tank, then the latch rim is connected to the lid.

The pivoting element 70 pivots with respect to the tank 12 and the lid 14. The pivoting element seen in FIGS. 7 and 8 has an inner face 80 that extends downwardly from a top face 82. A central axis 84 extends generally parallel to the inner face, and a horizontal pivot 86 at a lower end of the inner face connects to the lid. The horizontal pivot is aligned with an axis 87 that is stationary with respect to the lid and enables the central axis of the pivoting element to be tilted about the horizontal pivot and thus rotated with respect to the lid about the stationary axis, moving an outer end 88 of the pivoting element towards and away from the tank. The required range of motion of this pivoting movement will be discussed below.

The latch rim 78 (FIGS. 1, 2, and 9) has a terminal edge 90 and a lateral side 92 against which other elements of the latch are secured. As mentioned above, the illustrated latch rim is connected to the tank 12, and the lateral side of the latch rim is spaced between ¼ of an inch and 1 inch away from the rest of the tank. The lateral side ends at the terminal edge, which is arranged horizontally and is between ½" and 3" in length. The lateral side is made of a rigid material and is strong enough to hold the lid to the tank.

Figure 9:
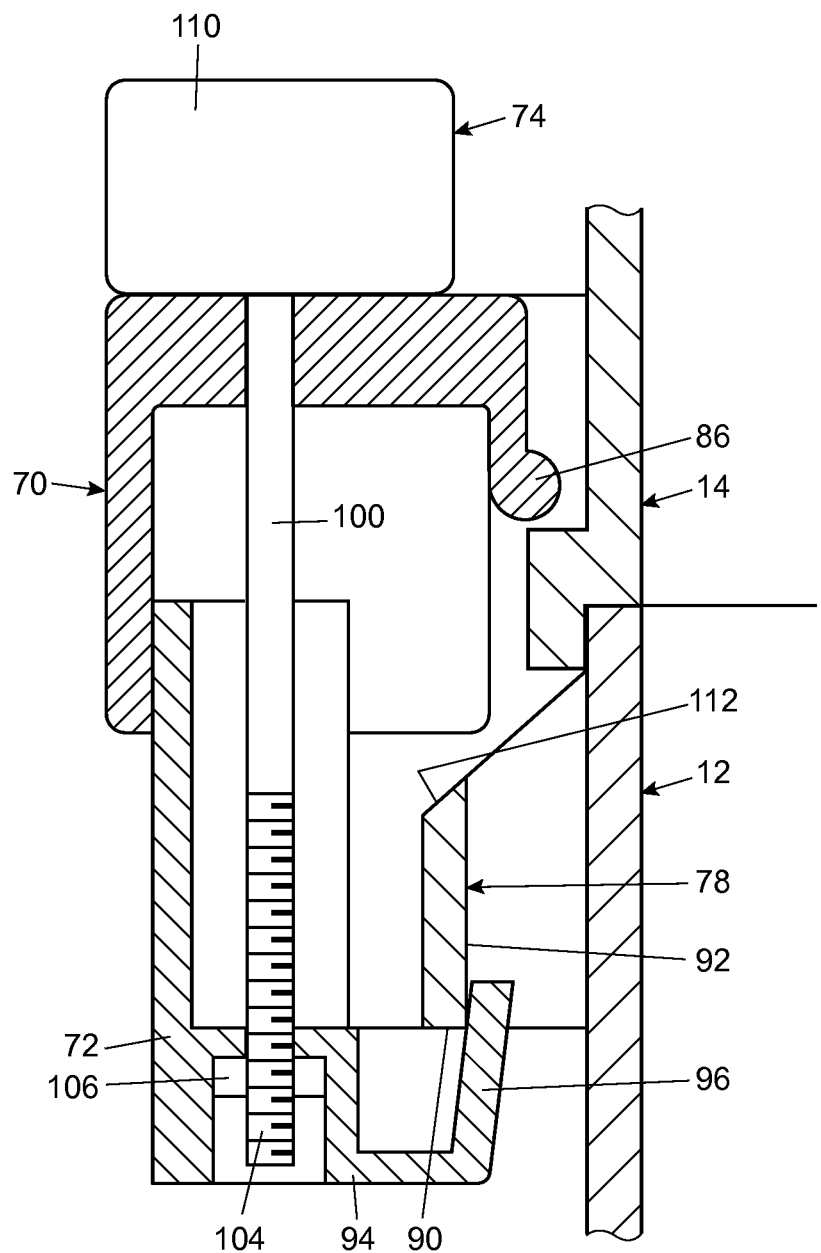
FIG. 9 is an enlarged cross-sectional view of the complete latch in a closed position.

The clasp 72 is movably connected to pivoting element 70 and, as explained below, arranged so that it can be moved along the central axis 84 of the pivoting element. For locking the lid 14 to the tank 12, a bent arm 94 on the clasp fits across the terminal edge 90 of the latch rim 78 and against the lateral side 92 of the latch rim. The illustrated bent arm is between ½" and 2" wide, and has a hook portion 96 that is between ¹⁄₁₆" and ½" high. When the latch is closed, as seen in FIG. 9, interference between the hook portion and the lateral side of the latch rim helps to prevent the clasp from breaking engagement with the latch rim.

The tensioner 74 is connected to the pivoting element 70 and pulls the bent arm 94 of the clasp 72 against the terminal edge 90 of the latch rim 78 and thus holds the lid 14 against the open rim 20 of the tank 12. The tensioner has a threaded rod 100 that extends though a hole 102 in the top face 82 of pivoting element 70. The illustrated threaded rod is a steel rod with a diameter of between ⅛" and ⅜". A threaded end 104 of the threaded rod receives a nut 106 that is fixed in the clasp. The illustrated nut is a standard hex nut fixed in a chamber in a lower section of the clasp. A handgrip 110 on the opposite end of the threaded rod enables a user to easily rotate the threaded rod. The illustrated handgrip is a plastic knob that is between ½" and 2½" wide. Rotating the rod in one direction advances the threaded rod in the nut. When the bottom of the knob lies against the top face of the pivoting element, this movement draws the clasp closer to the top face of the pivoting element. Rotating the rod in the other direction retracts the rod, allowing the clasp and the pivoting element to move apart.

To detach the lid 14 from the tank 12, the threaded rod 100 is first loosened so that the hook portion 96 of the clasp 72 can clear the terminal edge 90 of the latch rim 78. The pivoting element 70 is then pivoted outwardly, enabling the hook portion of the clasp to be moved outwardly beyond the latch rim, and thus enabling the lid to be lifted off the tank.

To secure the lid 14 to the tank 12, the process is reversed. As the lid is moved toward the rim, a sloped upper side 112 on the latch rim 78 may be used to deflect the hook portion 96 of the clasp 72 outwardly until it clears the latch rim. The center of gravity of the disclosed pivoting element 70, clasp, and tensioner 74 is laterally outwardly of the horizontal pivot 86. As a result, gravity urges the clasp to rotate inwardly toward the tank, moving the those elements into a position where advancing the threaded rod 100 draws the hook portion of the bent arm 94 of the clasp into the gap between the lateral face 92 of the latch rim and the rest of the tank.

This description of various embodiments of the invention has been provided for illustrative purposes. Revisions or modifications may be apparent to those of ordinary skill in the art without departing from the invention. The full scope of the invention is set forth in the following claims.

The invention claimed is:

1. A vacuum cleaning product that has:
a lid that fits on a tank, the tank and lid comprising distinct first and second product components that are arranged to be selectively separated by a user;
a vacuum source that is positioned on the lid and draws air into the vacuum cleaning product through an inlet on the lid, and blows air into the tank, pressurizing the tank;
a removable cap that fits over an inner end of a tubular element that extends from an opening inwardly into the tank, and has an outer wall with interior axial ribs that fit snugly against outer surfaces of the inwardly-extending tubular element;
a latch rim that is fixed in position on the first product component;
a pivoting element that is not directly attached to the first product component and is pivotally connected to and pivots about a stationary element that is fixed in position on the second product component;
a clasp that moves axially with respect to the pivoting element and has a bent arm that fits across a terminal edge of the latch rim and against a lateral side of the latch rim; and
a tensioner that is connected to the pivoting element and pulls the bent arm against the terminal edge of the latch rim and thus holds the lid on the tank.

2. A vacuum cleaning product that has:
a lid that fits on a tank, the tank and lid comprising distinct components that are arranged to be selectively separated by a user;
a vacuum source that is positioned on the lid and draws air into the vacuum cleaning product through an inlet on the lid, and blows air into the tank, pressurizing the tank;
a removable cap that fits over an inner end of a tubular element that extends from an opening inwardly into the tank;
a pivoting element that is on the lid, is not directly attached to the tank, and is pivotally connected to and pivots about a stationary element that is fixed in position on the lid;
a latch rim that is fixed in position on the tank;
a clasp that moves axially with respect to the pivoting element and has a bent arm that fits across a terminal edge of the latch rim and against a lateral side of the latch rim;
a sloped outer surface that is on the latch rim and deflects the clasp outwardly as the lid is lowered onto the tank;
a tensioner that is connected to the pivoting element and pulls the bent arm against the terminal edge of the latch rim and thus holds the lid on the tank; and
the center of gravity of the pivoting element, the clasp, and the tensioner being laterally outwardly of the stationary element.

3. A vacuum cleaning product that has:
a lid that fits on a tank in which dirt and debris are stored;
a vacuum source that draws air into the vacuum cleaning product through an inlet on the lid, is in fluid communication with the tank, and is positioned upstream of the tank so that it blows air into the tank, positively pressurizing the tank;
a tubular element that extends inwardly from an opening on the tank and has an interior end inside the tank; and
a removable cap that is selectively removable from the tank by a user and manually positionable to fit onto and seal the interior end of the tubular element without threads, closing the opening when the tank is pressurized by the vacuum source.

4. A vacuum cleaning product as recited in claim 3, in which the cap is not rigidly or pivotally attached to either the tank or to the lid, and has an outer wall with interior axial ribs that fit snugly against outer surfaces of the inwardly-extending tubular element.

* * * * *